US008168104B2

(12) United States Patent
Han et al.

(10) Patent No.: US 8,168,104 B2
(45) Date of Patent: May 1, 2012

(54) IN-LINE PROCESS FOR PREPARING WOOD PLASTIC COMPOSITE PANEL WITH THE APPEARANCE AND TEXTURE SIMILAR TO NATURAL LUMBERS AND APPARATUS THEREFOR

(75) Inventors: Yousoo Han, Daejeon (KR); Seongchan Park, Cheongju-si (KR); Jungil Son, Gunpo-si (KR); Dongjin Kim, Daejeon (KR); Sangho Han, Cheongju-si (KR); Yunhwan Hwang, Seoul (KR)

(73) Assignee: LG Chem, Ltd., Seoul (KR)

(*) Notice: Subject to any disclaimer, the term of this patent is extended or adjusted under 35 U.S.C. 154(b) by 102 days.

(21) Appl. No.: 12/085,563

(22) PCT Filed: Nov. 13, 2006

(86) PCT No.: PCT/KR2006/004723
§ 371 (c)(1), (2), (4) Date: Jan. 6, 2009

(87) PCT Pub. No.: WO2007/061193
PCT Pub. Date: May 31, 2007

(65) Prior Publication Data

US 2009/0206503 A1 Aug. 20, 2009

(30) Foreign Application Priority Data

Nov. 28, 2005 (KR) ........................ 10-2005-0114228

(51) Int. Cl.

| | |
|---|---|
| ***D01D 5/16*** | (2006.01) |
| ***D01D 5/12*** | (2006.01) |
| ***B29C 47/00*** | (2006.01) |
| ***B29C 47/12*** | (2006.01) |
| *B44F 7/00* | (2006.01) |

(52) U.S. Cl. ...... 264/210.2; 264/75; 264/76; 264/177.1; 264/177.11; 264/177.17; 264/177.2; 264/210.1; 264/210.5; 264/293; 52/313

(58) Field of Classification Search .................... 264/75, 264/76, 210.1, 210.2, 210.5, 293, 177.1, 264/177.11, 177.17, 177.2; 52/313
See application file for complete search history.

(56) References Cited

U.S. PATENT DOCUMENTS 2,846,801 A * 8/1958 Brown ........................... 451/65
(Continued)

FOREIGN PATENT DOCUMENTS

JP 54-064552 5/1979
(Continued)

*Primary Examiner* — Christina Johnson
*Assistant Examiner* — Atul P Khare
(74) *Attorney, Agent, or Firm* — McKenna Long & Aldridge LLP

(57) ABSTRACT

Disclosed herein are a method of manufacturing a wood plastic composite panel, including a panel manufacturing process of extruding and cooling a resin complex, such that wood fiber is uniformly dispersed into a synthetic resin matrix, to manufacture the resin complex into the form of a panel, an embossing process of forming a wood pattern corresponding to the cut-open surface of a natural lumber on the surface of the panel to a predetermined depth, and a brushing process of removing some of a synthetic resin layer from the surface of the panel to form linear micro concavo-convex parts to a predetermined depth, and an apparatus for manufacturing a wood plastic composite panel that is capable of efficiently performing the same. The method of manufacturing a wood plastic composite panel according to the present invention has the effect of directly realizing a wood pattern, which has the appearance and the texture similar to the open-cut surface of a natural lumber, on the surface of the wood plastic composite panel, and, at the same time, maximizing the advantage of the material comprising the wood fiber and the synthetic resin.

8 Claims, 4 Drawing Sheets

U.S. PATENT DOCUMENTS

| | | | | | |
|---|---|---|---|---|---|
| 2,890,493 | A * | 6/1959 | Clark | ............................ | 19/65 R |
| 4,076,566 | A | 2/1978 | Power | | |
| 4,304,751 | A * | 12/1981 | Li et al. | ......................... | 264/322 |
| 4,710,333 | A * | 12/1987 | Murakami et al. | .............. | 264/73 |
| 5,219,627 | A * | 6/1993 | Arase et al. | .................. | 428/35.7 |
| 5,534,352 | A * | 7/1996 | Pittman et al. | ................ | 428/535 |
| 5,866,639 | A * | 2/1999 | Dorchester et al. | ........... | 523/171 |
| 5,866,641 | A | 2/1999 | Ronden et al. | | |
| 6,153,293 | A * | 11/2000 | Dahl et al. | ................. | 428/310.5 |
| 2003/0224173 | A1* | 12/2003 | Sackinger et al. | ......... | 428/411.1 |
| 2004/0126515 | A1* | 7/2004 | Yarmoska | .................... | 428/34.1 |
| 2004/0131828 | A1* | 7/2004 | Edgman | ........................ | 428/156 |
| 2004/0135282 | A1* | 7/2004 | Ozaki et al. | ................... | 264/122 |
| 2004/0139673 | A1 | 7/2004 | Luetgert et al. | | |

FOREIGN PATENT DOCUMENTS

| | | |
|---|---|---|
| JP | 08-224796 | 9/1996 |
| JP | 09-039008 | 2/1997 |
| JP | 11-062414 | 3/1999 |

* cited by examiner

[Fig. 1]
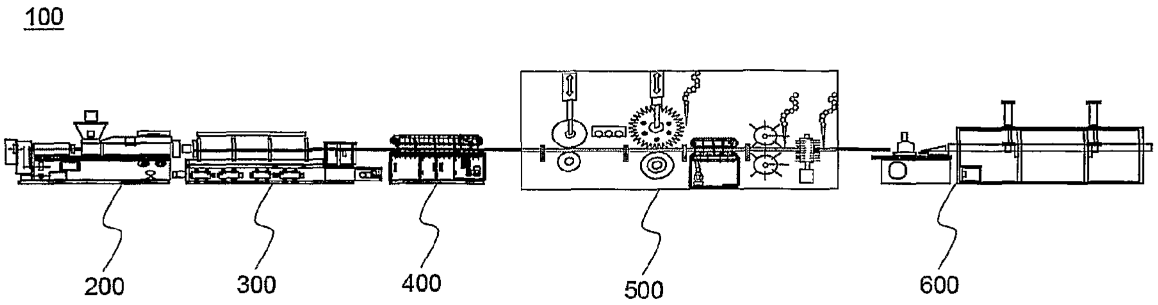

[Fig. 2]
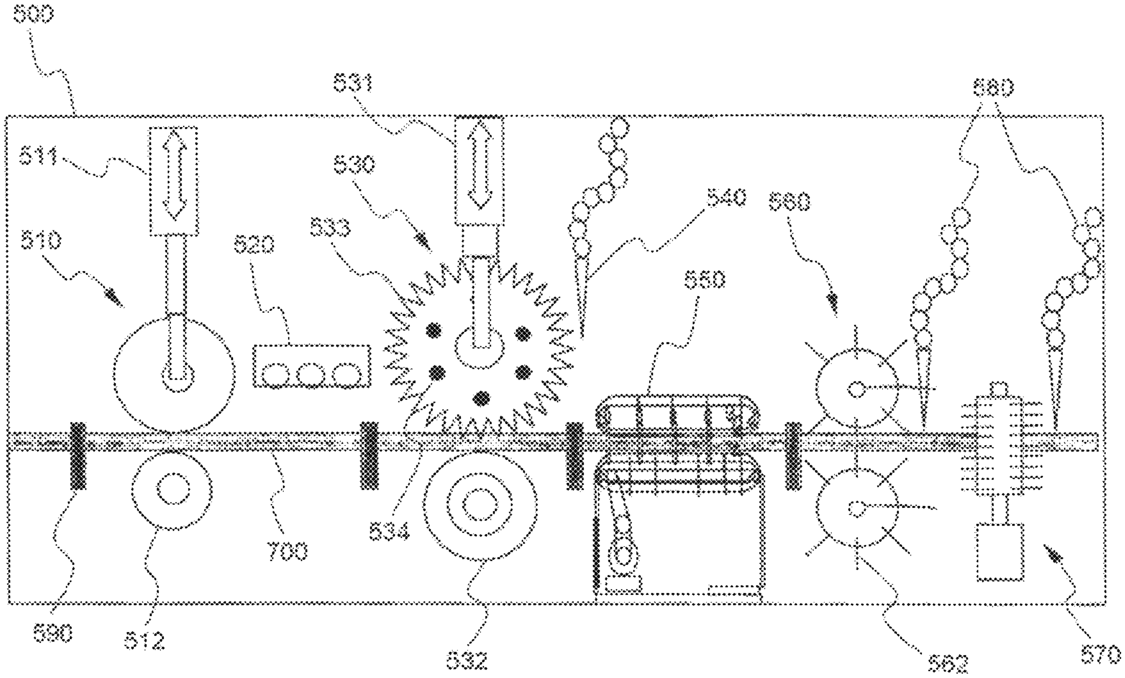
[Fig. 3]
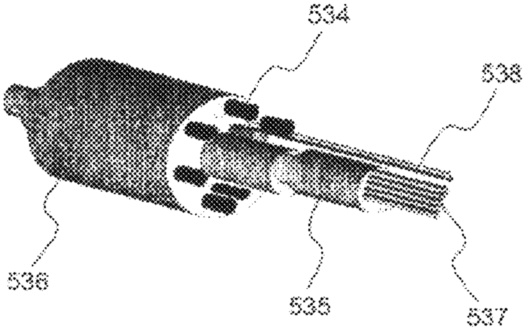

[Fig. 4]
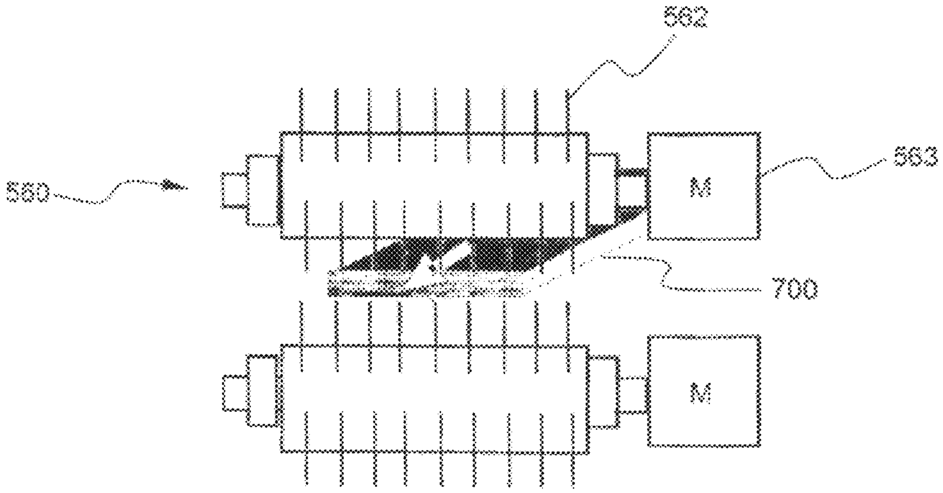
[Fig. 5]
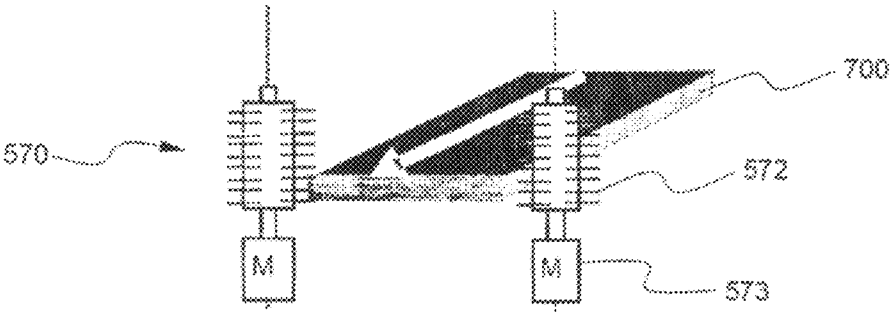
[Fig. 6]
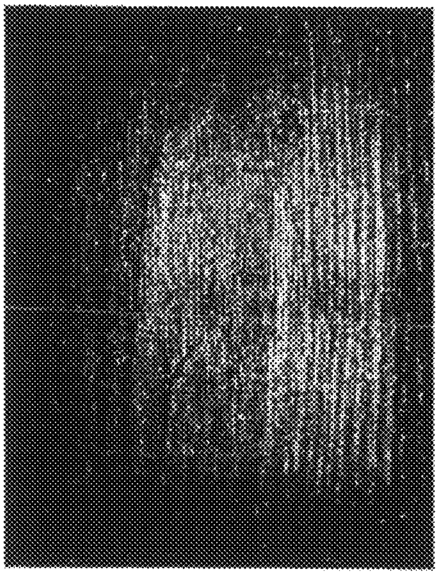

[Fig. 7]
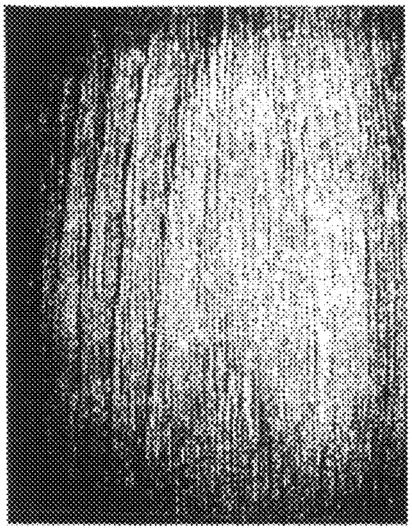
[Fig. 8]
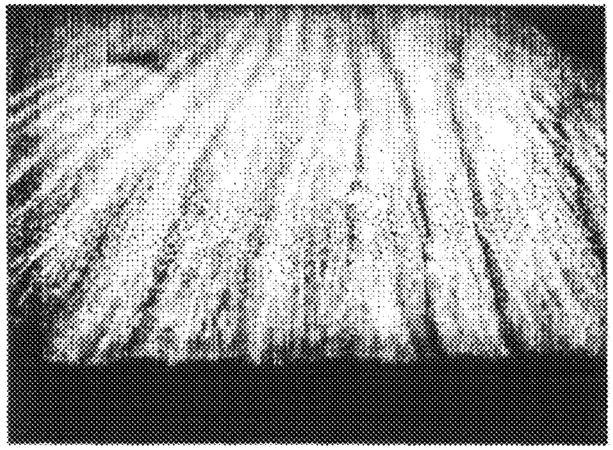
[Fig. 9]
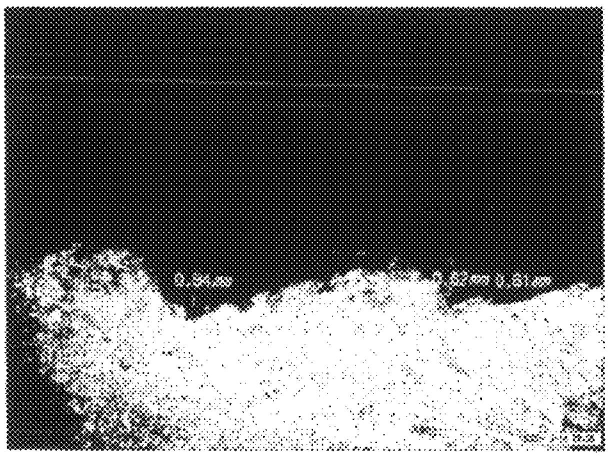

IN-LINE PROCESS FOR PREPARING WOOD PLASTIC COMPOSITE PANEL WITH THE APPEARANCE AND TEXTURE SIMILAR TO NATURAL LUMBERS AND APPARATUS THEREFOR

This application claims the benefit of International Application Number PCT/KR/2006/0044723 filed on Nov. 13, 2006 and Korean Application No. 10-2005-0114228 filed on Nov. 28, 2005, both of which are hereby incorporated by reference as if fully set forth herein.

TECHNICAL FIELD

The present invention relates to a method and an apparatus for manufacturing a wood plastic composite panel having the appearance and texture similar to natural lumbers, and, more particularly, to a method of manufacturing a wood plastic composite panel that is capable of, after performing extruding and cooling a resin complex, such that wood fiber having a predetermined size is uniformly dispersed into a synthetic resin matrix, to manufacture the resin complex into the form of a panel, sequentially performing an embossing process of forming a wood pattern corresponding to the cut-open surface of a natural lumber on the surface of the panel by applying temperature and pressure and a brushing process of forming linear micro concavo-convex parts, and an apparatus for manufacturing a wood plastic composite panel that is capable of performing the same.

BACKGROUND ART

Building materials using natural lumbers have a problem in that the shape or the texture of the building materials is easily damaged due to water or sunlight. For this reason, much research has been carried out to develop a wood plastic composite lumber that can eliminate the problem of the natural lumbers. The wood plastic composite lumber is manufactured by mixing granular or pellet-shaped wood fiber and synthetic resin at a predetermined mixing ratio, adding various additives according to the use of products, and forming the mixture into the shape of a panel using extrusion or injection.

In the wood plastic composite panel manufactured as described above, however, the synthetic resin, which is a matrix component of the resin complex, constitutes an outer layer on the surface of the panel after the extrusion. As a result, the appearance and the texture peculiar to the natural lumber are not provided due to the oil-like tactile sensation and high gloss peculiar to the plastic although the wood fibers are used as a filler. Consequently, various attempts have been made to solve the problems of the wood plastic composite panel.

Specifically, several attempts have been made to provide the appearance and the surface texture of the natural lumber to the wood plastic composite panel. For example, a method of performing extrusion using pigment having different colors, a method of manually processing a wood pattern, a method of transferring or printing a wood pattern, and a method of laminating films having a wood pattern of natural lumbers or artificial materials have been usually used. However, these methods have problems in that the manufacturing process is very complicated, and, in some cases, the durability of products is lowered.

In order to solve the above-mentioned problems, there have been proposed new methods that are capable of providing the texture maximally similar to the cut-open surface of the natural lumber to the surface of the wood plastic composite lumber. A representative example of the proposed methods is a method of forming a repetitive embossed pattern on the surface of a wood plastic composite lumber moving in a predetermined direction by vertically pressing a circular roll having a predetermined embossed carving and depressed carving set toward the surface of the panel from above or rotating the circular roll at high speed using a power transmission unit. This method of forming the embossed wood pattern on the surface of the panel may be performed after the extruded panel is cut into a predetermined size.

The wood plastic composite panel is provided at the surface thereof with a pattern similar to the wood pattern. However, the wood plastic composite panel has high gloss, and, when a user touches the wood plastic composite panel, oil-like tactile sensation peculiar to the synthetic resin is felt by the user. As a result, the provision of luxury appearance and texture of the natural lumber is limited although the provision of the wood pattern is possible.

In the case of a natural lumber panel manufactured by directly processing a natural lumber, excellent appearance and texture are provided after the surface of the manufactured natural lumber panel is smoothly processed. Consequently, a high-quality natural lumber panel, the surface of which has been sophisticatedly treated, is usually used for interior and exterior decorations of buildings. The surface-treated natural lumber panel has a beautiful wood pattern, a smooth and soft tactile sensation, and appropriate gloss. As a result, it is possible to represent the wood pattern. This is caused by the unique physical properties of a cellulose polymer constituting the lumber and complex actions of the natural lumber tissues.

When the surface of a wood plastic composite lumber is smoothly treated in the same manner as the natural lumber, on the other hand, the wood plastic composite lumber has high gloss and oil-like tactile sensation peculiar to the synthetic resin.

Consequently, the necessity of a technology for providing the appearance and the texture similar to the cut-open surface of a natural lumber at low costs although a resin complex including synthetic resin and wood fiber is used as a material is very high.

DISCLOSURE OF INVENTION

Technical Problem

Therefore, the present invention has been made to solve the above problems, and other technical problems that have yet to be resolved.

Specifically, it is a first object of the present invention to provide a method of manufacturing a wood plastic composite panel that is capable of directly realizing a wood pattern which has the appearance and the texture similar to the open-cut surface of a natural lumber on the surface of the wood plastic composite panel, and, at the same time, maximizing the advantage of the material comprising wood fiber and synthetic resin, excluding a printing method using inkjet printing or roll printing and a post-processing method of laminating a decoration sheet on a cut material lumber panel.

It is a second object of the present invention to provide a method of manufacturing a wood plastic composite panel that is capable of omitting a conventional post-processing operation to perform surface treatment on the panel, which has been cut into a standardized size after the extrusion of the panel, thereby directly performing the surface treatment on the panel during the extruding process without changing the extrusion speed, and therefore, minimizing the increase of the manufacturing costs caused by the post-processing operation.

It is a third object of the present invention to provide an apparatus for manufacturing a wood plastic composite panel that is capable of efficiently performing the method of manufacturing the wood plastic composite panel.

Technical Solution

In accordance with one aspect of the present invention, the above and other objects can be accomplished by the provision of a method of manufacturing a wood plastic composite panel, comprising: (a) a panel manufacturing process of extruding and cooling a resin complex, such that wood fiber is uniformly dispersed into a synthetic resin matrix, to manufacture the resin complex into the form of a panel; (b) an embossing process of forming a wood pattern corresponding to the cut-open surface of a natural lumber on the surface of the panel to a predetermined depth after the process (a) is completed; and (c) a brushing process of removing some of a synthetic resin layer from the surface of the panel to form linear micro concavo-convex parts to a predetermined depth after the process (b) is completed.

The manufacturing method according to the present invention is characterized in that the appearance and the texture corresponding to the cut-open surface of the natural lumber can be realized on the surface of the panel without the printing or the sheet lamination and that the panel manufacturing process, the embossing process, and the brushing process are sequentially carried out, such that the surface treatment of the panel is accomplished before the panel is cut into a predetermined size, whereby the overall process is greatly simplified.

The term used in the specification "sequential process" means that a series of operations are progressed without the panel being separated from the manufacturing process. Consequently, the addition of some steps into the sequential process in order to optimize the process is not excluded. For example, as will be described below, a process for preheating the panel may be added prior to the embossing process, and a process for cooling the panel may be added prior to the brushing process.

Also, the manufacturing method according to the present invention is characterized in that an embossed structure of a lumber cut-open pattern is formed on the surface of the panel at a predetermined depth, and a linear micro concavo-convex structure is also formed on the surface of the panel at a predetermined depth.

As a result of a variety of extensive and intensive studies and experiments, the inventors of the present invention have found that, both the embossed structure and the linear micro concavo-convex structure are formed on the surface of a resin complex panel based on synthetic resin, the resin complex panel provides the appearance and the texture corresponding to the natural lumber although the resin complex panel has a surface structure different from the cut-open surface of the natural lumber. Consequently, the present invention provides a method of manufacturing a wood plastic composite panel having a novel structure.

The resin complex extruded in the process (a) includes synthetic resin as a matrix components and wood fiber as a filler. The synthetic resin is not particularly restricted so long as the synthetic resin is a polymer that has high compatibility with the wood fiber and has high strength and durability. Preferably, a polyethylene-based polymer resin, a polypropylene-based polymer resin, or a polystyrene-based polymer resin may be used as the synthetic resin.

The wood fiber includes wood powder obtained by pulverizing a natural lumber or a recycled wood into the form of a granule or a pellet and short fiber obtained by cutting other kinds of natural fiber (for example, hemp, flex, jute, kenaf, cellulose, etc.) into a predetermined length. The wood fiber may have approximately 20 to 80 weight percent, preferably 30 to 50 weight percent, on the basis of the total weight of the resin complex, although the weight percent of the wood fiber may be changed depending upon the use of the wood plastic composite panel. However, when the content of the wood fiber is too small, the content of the synthetic resin is increased, and therefore, it is difficult to provide the appearance and the texture corresponding to the natural lumber. When the content of the wood fiber is too large, the content of the synthetic resin is decreased, and therefore, the coupling force of the wood fiber is reduced. Consequently, it is difficult to provide the strength and the durability to a desired degree.

The wood fiber has a size of 20 to 300 meshes, preferably 90 to 150 meshes. When the size of the wood fiber is too large, the strength of the panel is decreased. When the size of the wood fiber is too small, on the other hand, the distribution of the wood fiber in the resin complex is not uniform. Especially, the panel cannot provide desired appearance and texture although the panel has the embossed structure and the micro concavo-convex structure, which will be described below in more detail.

In the melting and extruding process, the pellet-shaped synthetic resin is introduced through the hopper, is melted in a heated extruder, and is then mixed with other components in the extruder. In the resin complex according to the present invention, for example, the synthetic resin pellet and the wood fiber are introduced into the extruder through the hopper, and are then mixed in the extruder.

Various components may be added to the resin complex depending upon the use of the panel.

Typically, a pigment may be added to the resin complex at 1 to 5% by weight on the basis of the total weight of the resin complex, such that various colors can be provided for kinds of lumber. Preferably, an inorganic pigment is added to the resin complex because the possibility of discoloration due to sunlight is low, and therefore, the inherent color thereof is maintained for a long time. The pigment may be used alone. According to circumstances, however, a combination including two or more pigments may be used to represent various colors.

Preferably, the pigment may be introduced in the form of a master batch (e.g., pellet) through a main hopper or a side hopper. The resin of the pigment-containing master batch may be identical to or different form the synthetic resin as the matrix component. Preferably, the pigment may be used in the manufacturing method according to the present invention in the form of a master batch in which an inorganic pigment is added to a resin identical to the synthetic resin as the matrix component.

In a preferred embodiment, the synthetic resin as the matrix component has a melt index of 1.0 to 3.0, and the resin of the pigment-containing master batch has a melt index of 1 to 30. Also, the resins are supplied together through the main hopper, and are then uniformly mixed by a melting temperature of an extruder barrel or by the mechanical mixing performed by a screw in the barrel, whereby it is possible to realize colors of the cut-open surfaces depending upon kind of natural lumber.

According to circumstances, a master batch (B), which contains a resin having a melt index lower than that of the resin of the pigment-containing master batch (A) supplied through the main hopper and also a pigment having a color different from that of the pigment of the master batch (A), may be supplied through the side hopper, whereby it is possible to manufacture a panel characterized in that the pigment of the master batch (B) is not completely mixed with the pigment of the master batch (A), and therefore, the panel has a nonuniform boundary.

The extrusion, the calibration, and the cooling for manufacturing the panel may be carried out according to a general fashion.

Preferably, the panel extruded from the extruder die is transferred to the embossing stage using a power transmission unit.

The process (b), i.e., the embossing process, is a first surface-treatment process for forming a wood pattern shown in section when a lumber is cut ("a lumber cut-open pattern") on the surface of the panel in an embossed structure having embossed carving and depressed carving. Preferably, this process is performed by pressing an embossing roll having a shape corresponding to the lumber cut-open pattern carved at the surface thereof to the surface of the panel while heating and pressing the embossing roll.

In order to form the lumber cut-open pattern on the surface of the panel, it is necessary to heat the surface of the panel to a temperature level around the melting point thereof. This may be accomplished by pressing, and, at the same time, heating the panel using a heating-type embossing roll.

According to circumstances, the manufacturing method may further comprise a preheating process of heating the panel to a predetermined temperature level, before the embossing process is performed, so as to prevent the surface deterioration and/or the deformation of the panel due to instantaneous heating. Generally, the melting point of the resin complex, when polyolefin is used as the matrix resin, is approximately 120 to 180° C. Consequently, it is preferable to preheat the panel to approximately 100 to 200° C. such that the panel can reach the target temperature level by the heating-type embossing roll.

The preheating process may be performed using various means. Preferably, the preheating process may be performed using an infrared heater. The heating-type embossing roll heats the panel through a small contact interface, whereas the preheating process is performed such that large area can be heated in a surface heating mode. Consequently, it is not necessary to rapidly heat the panel using the heating-type embossing roll, and therefore, uniform heating of the panel is possible.

The depth of the embossed structure formed in the embossing process may be changed depending upon various factors, such as the temperature, the pressure, and the rotating speed of the embossing roll, even when the depth of the shape carved at the surface of the embossing roll is not uniform. Consequently, it is possible to obtain a desired depth by appropriately adjusting the temperature, the pressure, and the rotating speed of the embossing roll.

Preferably, the manufacturing method may further comprise a cooling process of cooling the panel after the embossing process is completed. The cooling process may be performed in an air cooling mode using compressed air or in a water cooling mode using water.

The process (c), i.e., the brushing process, is a second surface-treatment process for removing some of a synthetic resin layer from the surface of the panel having the embossed structure formed at the surface thereof to form linear micro concavo-convex parts such that the panel has a predetermined surface roughness and low gloss. Preferably, this process is performed by rotating brushing rolls, which have a plurality of iron brushes having predetermined thickness and length and formed regularly or irregularly at the outer surfaces thereof, on the surface of the panel at high speed.

During the brushing process, some of the synthetic resin layer is removed from the surface of the panel. According to circumstances, wood fiber is exposed to the outside, and the linear micro concavo-convex structure is formed on the surface of the panel in the rotating direction of the brushing roll. The depth of the linear micro concavo-convex structure may be adjusted depending upon various factors, such as the thickness and the length of the iron brushes, the rotating speed of the roll, the distance between the panel and the roll, etc.

The brushing process is mainly performed on the upper surface of the panel. According to circumstances, however, the brushing process may be formed in the lower surface and/or the side surfaces of the panel.

The embossed structure of the panel provides the beautiful pattern of the cut-open surface of the natural lumber. However, the panel cannot provide the appearance and the texture corresponding to the cut-open surface of the natural lumber due to the unique physical properties of the synthetic resin complex although the panel has the embossed structure. Consequently, although the linear micro concavo-convex structure is formed on the embossed structure by the brushing process with the result that the embossed structure is partially changed, the fundamental problems of the synthetic resin complex are eliminated, and the panel provides the appearance and the texture corresponding to the cut-open surface of the natural lumber by the composite structure finally formed by the embossed structure and the linear micro concavo-convex structure.

When only the linear micro concavo-convex structure is formed on the surface of the panel by the brushing process without performing the embossing process, on the other hand, it is possible to greatly weaken the unique physical properties of the synthetic resin; however, it is not possible to provide the unique physical properties, especially the beautiful appearance, of the natural lumber. Furthermore, it has been proven that the embossed structure and the linear micro concavo-convex structure provide desired effects when the embossed structure and the linear micro concavo-convex structure satisfy the following specific conditions.

Specifically, when the embossed structure has an average depth of 200 to 900 μm, preferably 500 to 600 μm, the linear micro concavo-convex structure has an average depth of 10 to 500 μm, preferably 200 to 300 μm, and the panel has a reflection rate of 10 to 50%, preferably 10 to 30%, when light is incident on the surface of the panel at an incidence angle of 60 degrees, it is possible to obtain the appearance and the texture comparable with the natural lumber although synthetic resin-based resin complex is used as a material.

When the depth of the embossed structure is too small or too large, the distance between the respective protrusions of the embossed structure is too narrow or too wide. As a result, the oil-like tactile sensation of the synthetic resin is increased, and the light reflection rate at the surface of the panel is increased. Consequently, the panel cannot provide the appearance and the texture of the natural lumber.

In addition, when the depth of the linear micro concavo-convex structure is too small, the oil-like tactile sensation of the synthetic resin is not sufficiently eliminated. When the depth of the linear micro concavo-convex structure is too large, on the other hand, the pattern corresponding to the natural lumber pattern is excessively damaged.

The micro concavo-convex structure is formed on the surface of the panel in a linear shape, unlike the embossed structure of the lumber cut-open pattern. Preferably, the micro concavo-convex structure may be formed on the surface of the panel in parallel with the grain of the lumber cut-open pattern.

When the light reflection ratio obtained by the embossed structure and the linear micro concavo-convex structure is too large, gloss of the panel is increased, and therefore, it is difficult to provide the appearance corresponding to the cut-open surface of the natural lumber. When the depth of the embossed structure and the linear micro concavo-convex structure is large, on the other hand, it is possible to obtain small light reflection ratio; however, the surface roughness of the panel is excessively increased.

The wood plastic composite panel manufactured by the method according to the present invention may be cut into a predetermined size and form according to the use of the panel.

In accordance with another aspect of the present invention, there is provided an apparatus for manufacturing a wood plastic composite panel that is capable of efficiently performing the above-described method of manufacturing the wood plastic composite panel.

The apparatus for manufacturing the wood plastic composite panel according to the present invention comprises: an extruding unit for extruding a resin complex so as to manufacture the resin complex into the form of a panel; a cooling unit for cooling the extruded panel; a withdrawing unit for withdrawing the cooled panel from the cooling unit such that the panel can be transferred to a subsequent stage; a surface treatment unit for sequentially performing an embossing process and a brushing process on the surface of the panel; and a cutting unit for cutting the surface-treated panel into a predetermined size and form.

The manufacturing apparatus according to the present invention is characterized in that the embossing process and the brushing process are sequentially carried out in the surface treatment unit and that the surface treatment unit is positioned before the cutting unit.

The extruding unit, and the cooling unit, the withdrawing unit, and the cutting unit are identical to or very similar to those of a conventional apparatus for manufacturing a wood plastic composite panel. The withdrawing unit serves to withdraw the panel from the cooling unit and transfer the withdrawn panel to the subsequent surface treatment unit, thereby providing a driving force to the surface treatment unit.

The surface treatment unit includes a heating-type embossing roll having a shape corresponding to a lumber cut-open pattern carved at the surface thereof such that an embossed structure is formed at the surface of the panel by applying temperature and pressure, and brushing rolls having a plurality of iron brushes formed at the outer surfaces thereof such that a linear micro concavo-convex structure is formed at the surface of the panel having the embossed structure already formed at the surface thereof, the brushing rolls being rotated at high speed.

The heating-type embossing roll is provided at the surface thereof with an embossed carving and depressed carving set having a shape corresponding to the lumber cut-open pattern, the heating-type embossing roll is pressed on the panel at a predetermined pressure level by a pressure control part, the heating-type embossing roll has a plurality of electric-type heating rods mounted in the rotation shaft direction of the roll, and the heating-type embossing roll is constructed such that heating oil heated by the heating rods is circulated in the interior of the roll to uniformly maintain the temperature of the entire roll. The pressure control part serves to press the embossing roll on the surface of the panel using hydraulic pressure or pneumatic pressure.

The melting point of the panel may be changed depending upon kind of synthetic resin, kind and size of the wood fiber, the contents of the synthetic resin and the wood fiber, etc. Consequently, it is possible to decide a desired heating temperature by controlling the amount of electric power supplied to the heating rods. Also, the pressure of the roll applied to the panel so as to form the embossed structure may be decided depending upon various factors. For example, the pressure of the roll may be greater than the atmospheric pressure (approximately 1 bar) and less than 10 bars.

The heating-type embossing roll may include an additional power supply such that the heating-type embossing roll can rotate by itself. Preferably, however, the heating-type embossing roll may be constructed such that the roll pressed on the panel is rotated in a non-power state, as the panel is moved, to transfer the lumber cut-open pattern to the surface of the panel.

In the case of the non-power driven embossing roll, it is preferable that a driving roll for maintaining the transfer speed of the panel be mounted before the embossing roll. The driving roll provides a driving force to the panel while the driving roll is in contact with the panel. According to circumstances, therefore, the driving roll may be constructed such that the driving roll has heating rods and heating oil for preheating the panel.

In a preferred embodiment, an additional preheating part may be mounted between the driving roll and the embossing roll in order to improve the efficiency of the embossing process by the embossing roll. The embossing roll heats the panel through a small contact interface. Consequently, it is preferable to construct the preheating part in a contact or non-contact type surface heating structure such that the panel can be easily heated by the preheating part.

Preferably, an air-cooling type or water-cooling type cooling part is mounted between the embossing roll and the brushing rolls for cooling the panel heated by the embossing roll such that a synthetic resin layer can be effectively removed from the surface of the solidified panel.

Preferably, guide rolls for transferring the panel in a pressurized state may be mounted after the cooling part in order to prevent the deformation, such as bending, of the panel due to residual heat and stress remaining in the panel cooled by the cooling part.

The brushing rolls are constructed in a structure in which the brushing rolls are provided with a plurality of iron brushes having predetermined thickness and length, which are regularly or irregularly formed at (stuck into) the outer surfaces thereof, and the brushing rolls are rotated on the surface of the panel at high speed. The brushing rolls may be rotated either in the same direction as the movement direction of the panel or in the direction opposite to the movement direction of the panel.

The thickness and length of the iron brushes, the rotation speed of the brushing rolls, and the distance between the brushing rolls and the panel are closely related to the depth of the linear micro concavo-convex structure formed at the panel. Consequently, the thickness and length of the iron brushes, the rotation speed of the brushing rolls, and the distance between the brushing rolls and the panel may be changed depending upon a desired depth of the linear micro concavo-convex structure formed at the panel. For example, the depth of the linear micro concavo-convex structure may be adjusted by the following methods:

(i) a method of changing the thickness of the iron brushes;

(ii) a method of changing the length of the iron brushes;

(iii) a method of changing the rotation speed of the brushing rolls;

(iv) a method of changing the distance between the brushing rolls and the panel; and (v) a combination including two or more of the methods (i) to (iv).

For example, the iron brushes of the brushing rolls have a thickness of 0.1 to 0.5 mm and a length (length extending from the surfaces of the rolls) of 10 and 50 mm, and the brushing rolls are rotated at a speed of 50 to 500 rpm, while the brushing rolls are spaced by −10 to 0 mm (in the case that the length of the iron brushes contacting the panel is 0 to 10 mm) from the panel, so as to form the linear micro concavo-convex structure having a desired depth on the panel.

The number of the brushing rolls may be changed depending upon the number of the outer surfaces of the panel to which the surface treatment is to be performed. In the case that all the outer surfaces of the panel are to be surface-treated, the brushing rolls may include a pair of brushing rolls for performing the surface treatment to the upper and lower surfaces of the panel and another pair of brushing rolls for performing the surface treatment to the opposite side surfaces of the panel.

After the panel is surface-treated by the brushing rolls, a great amount of powder cut out of the panel remains on the surface of the panel. This powder may be removed from the surface of the panel, for example, by a compressed air injection part.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a typical view illustrating the overall construction of an apparatus for manufacturing a wood plastic composite panel according to a preferred embodiment of the present invention;

FIG. 2 is a typical view illustrating a surface treatment unit shown in FIG. 1;

FIG. 3 is a typical view, in part, illustrating one exemplary interior structure of an embossing roll shown in FIG. 2;

FIGS. 4 and 5 are typical views illustrating a brushing process for brushing the upper and lower surfaces and the opposite side surfaces of the panel using brush rolls shown in FIG. 2;

FIG. 6 is a plan-view photograph illustrating a panel having an embossed structure of a lumber cut-open pattern formed on the surface thereof according to Example 1;

FIG. 7 is an enlarged plan-view photograph illustrating a panel having a linear micro concavo-convex structure formed on the surface thereof in addition to the embossed structure; and FIGS. 8 and 9 are a plan-view photograph and an enlarged sectional-view photograph of a wood plastic composite panel manufactured according to Example 1 when the wood plastic composite panel is photographed from the side.

MODE FOR THE INVENTION

Now, preferred embodiments of the present invention will be described in detail with reference to the accompanying drawings. It should be noted, however, that the scope of the present invention is not limited by the illustrated embodiments.

FIG. 1 is a typical view illustrating the overall construction of an apparatus for manufacturing a wood plastic composite panel according to a preferred embodiment of the present invention.

Referring to FIG. 1, an apparatus 100 for manufacturing a wood plastic composite panel includes an extruding unit 200 for extruding a resin complex to manufacture the resin complex into the form of a panel, a cooling unit 300 for cooling the extruded panel, a withdrawing unit 400 for withdrawing the cooled panel from the cooling unit such that the panel can be transferred to a subsequent stage, a surface treatment unit 500 for performing an embossing process and a brushing process on the surface of the panel, and a cutting unit 600 for cutting the surface-treated panel into a predetermined size and form.

The extruding unit 200, the cooling unit 300, the withdrawing unit 400, and the cutting unit 600 are identical to or very similar to the conventional art. Accordingly, only the surface treatment unit 500 will be described below in detail with reference to FIG. 2.

Referring to FIG. 1, the surface treatment unit 500 includes a driving roll 510 for maintaining the transfer of a panel 700, a preheating part 520 for heating the panel 700 to a predetermined temperature level, an embossing roll 530 for performing an embossing process, a cooling-purpose compressed air injection part 540 for cooling the heated panel 700, a guide roll 550 for restraining the deformation of the panel, a pair of first brushing rolls 560 for performing a brushing process on the upper and lower surfaces of the panel 700, a pair of second brushing rolls 570 for performing a brushing process on the opposite side surfaces of the panel 700, a compressed air injection part 580 for removing powder, which remains on the outer surface of the panel 700 after performing the brush process, from the panel 700, and a plurality of side rotating rolls 590 contacting the sides of the panel 700 and having vertical rotation shafts for guiding the movement of the panel 700.

Above the driving roll 510 and the embossing roll 530 are mounted pressure control parts 511 and 531, respectively, by which the driving roll 510 and the embossing roll 530 contact one surface of the panel 700 while the driving roll 510 and the embossing roll 530 are pressed to a predetermined pressure. At the opposite surface of the panel 700 are positioned supporting rolls 512 and 532.

The embossing roll 530 heats the panel 700 through a small contact interface, whereas the preheating part 520 is constructed in a surface heating structure. Consequently, the preheating part 520 has more excellent heating efficiency than the embossing roll 530. Preferably, the preheating part 520 may be a non-contact type infrared heater as shown in the drawing.

The embossing roll 530 is a heating type roll. The embossing roll 530 is provided at the surface thereof with an embossed carving and depressed carving set 533 having a shape corresponding to a lumber cut-open pattern. Also, the embossing roll 530 has a plurality of electric-type heating rods 534 mounted in the rotation shaft direction of the roll. Heating oil heated by the heating rods 534 is circulated in the interior of the roll to uniformly maintain the temperature of the entire roll.

FIG. 3 is a typical view, in part, illustrating one exemplary interior structure of the embossing roll. Referring to FIG. 3, the electric-type heating rods 534 are radially mounted in the roll 536 in parallel with the rotation shaft 535. The heating rods 534 are heated by electricity supplied from an electric heater module 537. The overheating of the heating rods 534 is prevented by a thermocouple 538 also mounted in the roll 536.

Referring back to FIG. 2, the panel 700, on which the embossing process has been performed by the embossing roll 530, is in a heated state. Consequently, the panel 700 is cooled by air injected from the compressed air injection part 540 such that the subsequent process, i.e., the brushing process, can be performed.

During the heating and the cooling of the panel 700, residual heat partially remains in the panel. Furthermore, the panel 700 is pressed by the embossing roll 530. As a result, heat stress remains in the panel 700, which may deform, for example, bend the panel 700. For this reason, the heat stress remaining in the panel 700 is eliminated by the guide roll 550, and therefore, the deformation of the panel 700 is restrained.

The structure of the first brushing rolls 560 is fundamentally identical to that of the second brushing rolls 570. For example, the first brushing rolls 560 are constructed in a structure in which a plurality of iron brushes 562 are formed at the outer surfaces of the first brushing rolls 560.

As shown in FIGS. 4 and 5, the brushing rolls 560 and 570 are rotated at high speed by motors 563 and 573 to perform the brushing process on the upper and lower surfaces and the opposite side surfaces of the panel 700. The brushing rolls 560 and 570 may be rotated either in the same direction as the movement direction (indicated by an arrow) of the panel 700 or in the direction opposite to the movement direction of the panel 700. During the brushing process, the iron brushes 562 and 572 of the brushing rolls 560 and 570 rapidly rub against the surfaces of the panel 700 to cut off the synthetic resin of the surfaces of the panel 700. As a result, micro concavo-convex parts are formed on the surfaces of the panel 700.

Hereinafter, examples of the present invention will be described in detail. It should be noted, however, that the scope of the present invention is not limited by the illustrated examples.

EXAMPLE 1

100% by weight of polyethylene as a matrix component, 85% by weight of needle-leaf tree wood powder having approximately 100 meshes as a filler, 5% by weight of iron oxide (red) as an inorganic pigment, 5% by weight of a lubricant, and 10% by weight of a coupling agent were introduced into the extruding unit 200 of FIG. 1 through a hopper, were melted in the extruding unit 200, and were then extruded from the extruding unit 200. Subsequently, the embossing process and the brushing process were performed on the surface of an extruded panel by the surface treatment unit 500 of FIG. 1. Subsequently, the surface-treated panel was cut into a predetermined size by the cutting unit 600. In this way, a wood plastic composite panel was manufactured.

The embossing process was performed at a temperature of 180° C., at a pressure of 5 bar, and at a roll rotating speed of 80 rpm. The brushing process was performed by rotating the brushing rolls having a plurality of iron brushes 0.3 mm thick and 50 mm long at high speed, for example, at a speed of 300 rpm.

FIG. 6 is a plan-view photograph illustrating a panel having an embossed structure of a lumber cut-open pattern formed on the surface thereof according to the above-described manufacturing process, and FIG. 7 is an enlarged plan-view photograph illustrating a panel having a linear micro concavo-convex structure formed on the surface thereof in addition to the embossed structure. As can be seen from FIG. 7, a plurality of micro concavo-convex parts are linearly formed on the lumber cut-open pattern in the direction parallel with the lumber cut-open pattern.

FIGS. 8 and 9 are a plan-view photograph and an enlarged sectional-view photograph of a wood plastic composite panel which was finally manufactured when the wood plastic composite panel is photographed from the side. As can be seen from FIG. 8, the micro concavo-convex parts are linearly formed along the embossed structure of the lumber cut-open pattern. It can be confirmed from FIG. 9 that this embossed structure has a depth of approximately 600 to 850 μm. Or course, the depth of the embossed structure may be appropriately adjusted depending to the process conditions.

EXAMPLES 2 TO 4

A wood plastic composite panel was manufactured according the same method as Example 1 except that the length and thickness of the iron brushes of the brushing rolls were changed and the brushing process was performed at a speed of 300 rpm. The conditions of the brushing process are indicated in Table 1 below.

Light was incident on 12 arbitrary spots within the same area at the surface of the wood plastic composite panel manufactured as described above at an incidence angle of 60 degrees so as to measure the reflection rate. In addition, 10 persons were informed that estimation values of 5.0 were given with respect to the appearance and the texture of a natural lumber (cherry tree) panel, and were ordered to decide relative estimation values with respect to wood plastic composite panels of Examples 2 to 4. The results are indicated in Table 1 below.

<Table 1>

| Ex. | Thickness of iron brushes (mm) | Length of iron brushes (mm) | Average reflection rate (%) (final value: average) | | | | | | | | | | | | | Synthetic estimation on surface texture |
|---|---|---|---|---|---|---|---|---|---|---|---|---|---|---|---|---|
| 2 | 0 3 | 25 | 22 | 24 | 26 | 28 | 20 | 26 | 25 | 31 | 27 | 26 | 19 | 23 | (24.7) | 4.8 |
| 3 | 0 2 | 50 | 15 | 17 | 15.5 | 18 | 23 | 17 | 24 | 17 | 22 | 19 | 24 | 20.6 | (19.3) | 4.9 |
| 4 | 0 3 | 50 | 15 | 24 | 30 | 19 | 16 | 18 | 20 | 24 | 28 | 25 | 26 | 24.9 | (22.5) | 4.8 |

As can be seen from Table 1, the reflection rate was generally further decreased although the reflection rate was slightly different depending upon the conditions of the brushing process. Especially, the degree of satisfaction with respect to the surface texture was approximately 95% or more of the natural wood panel. Consequently, the degree of satisfaction was very high.

INDUSTRIAL APPLICABILITY

As apparent from the above description, the method of manufacturing a wood plastic composite panel according to the present invention has the effect of directly realizing a wood pattern which has the appearance and the texture similar to the open-cut surface of a natural lumber on the surface of the wood plastic composite panel, and, at the same time, maximizing the advantage of the material comprising the wood fiber and the synthetic resin. Furthermore, the conventional post-processing operation to perform surface treatment on the panel, which has been cut into a predetermined size after the extrusion of the panel, is not omitted. Consequently, the surface treatment can be performed on the panel during the extruding process without changing the extrusion speed, and therefore, the increase of the manufacturing costs caused by the post-processing operation is minimized.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of manufacturing a surface-treated wood plastic composite panel, comprising:

(a) mixing a synthetic resin matrix and wood fibers to uniformly disperse the wood fibers into the synthetic resin matrix and form a wood resin complex;

(b) extruding and then cooling the wood resin complex to form a wood plastic composite panel;

(c) preheating the wood plastic composite panel to a predetermined temperature to prevent surface deterioration and deformation during subsequent embossing;

(d) embossing a structure to a predetermined depth, the embossed structure corresponding to a grain pattern of a cut-open surface of natural lumber on a surface of the preheated wood plastic composite panel;

(e) cooling the embossed wood plastic composite panel; and (f) brushing the embossed surface of the cooled wood plastic composite panel to remove a portion of the synthetic resin from the embossed surface and to form a linear micro concavo-convex structure to a predetermined depth, the linear micro concavo-convex structure being parallel to the grain pattern of the embossed structure, wherein the embossed structure formed by the embossing process has an average depth of 200 to 900 μm and the linear micro concavo-convex structure formed by the brushing process has an average depth of 10 to 500 μm so that the resulting wood plastic composite panel has a reflection rate of 10 to 50% when light is incident on the surface of the panel at an incidence angle of 60 degrees.

2. The method according to claim 1, wherein the synthetic resin matrix is a polyolefin-based polymer resin, wherein the wood fibers are contained in the polyolefin-based polymer resin such that the wood fibers have approximately 20 to 80% by weight on the basis of the total weight of the wood resin complex, and wherein the wood fibers have a size of 20 to 300 meshes.

3. The method according to claim 1, wherein the wood resin complex further comprises an inorganic pigment at 1 to 5% by weight on the basis of the total weight of the resin complex.

4. The method according to claim 1, wherein the synthetic resin as the matrix component has a melt index of 1.0 to 3.0, a resin of a pigment-containing master batch has a melt index of 1 to 30, and the synthetic and master batch resins are supplied together through a main hopper and are then uniformly mixed by a melting temperature of an extruder barrel or by the mechanical mixing performed by a screw in the barrel.

5. The method according to claim 4, wherein a master batch (B), which contains a resin having a melt index lower than that of the resin of the pigment-containing master batch (A) supplied through the main hopper and also a pigment having a color different from that of the pigment of the master batch (A), is supplied through a side hopper.

6. The method according to claim 1, wherein the embossing process is performed by pressing a heating-type embossing roll having a pattern corresponding to the grain pattern of a cut-open surface of natural lumber carved at the surface thereof to the surface of the panel while heating the embossing roll.

7. The method according to claim 1, wherein the brushing is performed by rotating brushing rolls, which have a plurality of iron brushes having predetermined thickness and length and formed regularly or irregularly at the outer surfaces thereof, on the surface of the wood plastic composite panel.

8. The method according to claim 7, wherein the depth of the linear micro concavo-convex structure is adjusted by any one of the following methods:

(i) a method of changing the thickness of the iron brushes;

(ii) a method of changing the length of the iron brushes;

(iii) a method of changing the rotation speed of the brushing rolls;

(iv) a method of changing the distance between the brushing rolls and the panel; and (v) a combination including two or more of the methods (i) to (iv).

* * * * *